(12) United States Patent
Williams

(10) Patent No.: US 9,457,704 B2
(45) Date of Patent: Oct. 4, 2016

(54) ATV TRANSPORT DEVICE

(71) Applicant: Charles Leroy Williams, Pocatello, ID (US)

(72) Inventor: Charles Leroy Williams, Pocatello, ID (US)

( * ) Notice: Subject to any disclaimer, the term of this patent is extended or adjusted under 35 U.S.C. 154(b) by 29 days.

(21) Appl. No.: 14/645,514

(22) Filed: Mar. 12, 2015

(65) Prior Publication Data

US 2015/0258927 A1 Sep. 17, 2015

Related U.S. Application Data

(60) Provisional application No. 61/952,497, filed on Mar. 13, 2014.

(51) Int. Cl.
  *B60P 3/07* (2006.01)
  *B60P 1/43* (2006.01)
  *B60P 3/12* (2006.01)

(52) U.S. Cl.
  CPC .. *B60P 3/07* (2013.01); *B60P 1/43* (2013.01); *B60P 3/122* (2013.01)

(58) Field of Classification Search
  CPC .............. B60P 3/07; B60P 1/43; B60P 3/122
  See application file for complete search history.

(56) References Cited

U.S. PATENT DOCUMENTS

| | | |
|---|---|---|
| 3,704,794 A | 12/1972 | Flamm |
| 3,726,423 A | 4/1973 | Miron |
| 3,871,540 A | 3/1975 | Jenkins |
| 3,872,989 A | 3/1975 | Smithson et al. |
| 3,972,433 A | 8/1976 | Reed |
| 4,874,284 A | 10/1989 | New, Jr. |
| 4,954,038 A | 9/1990 | Sheahan |
| 5,281,075 A | 1/1994 | Tatman et al. |
| 5,431,525 A | 7/1995 | Scott |
| 5,501,481 A * | 3/1996 | Chumley ................. B60D 1/00 280/408 |
| 5,924,835 A | 7/1999 | Ross |
| 6,371,719 B1 | 4/2002 | Hildebrandt |
| 7,048,483 B2 | 5/2006 | Brown |
| 7,544,027 B2 | 6/2009 | Barker |
| 8,353,661 B2 | 1/2013 | Morasse |
| 2005/0058529 A1* | 3/2005 | Stidd ....................... B60D 1/00 414/563 |
| 2008/0014068 A1 | 1/2008 | Smith |
| 2009/0080992 A1* | 3/2009 | Dusik ..................... B60P 3/122 410/26 |
| 2010/0038391 A1* | 2/2010 | Cumbie ................... B60P 3/07 224/502 |
| 2011/0217137 A1* | 9/2011 | Benesch ................ B62D 63/06 410/4 |
| 2013/0223972 A1 | 8/2013 | Eng |

\* cited by examiner

*Primary Examiner* — Lori L Lyjak
(74) *Attorney, Agent, or Firm* — Robert L. Shaver; Shaver & Swanson, LLP

(57) ABSTRACT

A loading and transport device for all terrain vehicles. The loading and transport device loads two ATVs into a pickup bed by the use of a folding track that folds into an A frame shape by use of a jack. The ATVs are attached to the frame, and are transported in a generally vertical position. Loading involves unfolding the ATV racks, one of which reaches the ground. A winch is used to pull ATVs from the ground onto the ATV racks, and to lower them to the ground again.

12 Claims, 5 Drawing Sheets

ATV TRANSPORT DEVICE

PRIORITY/CROSS-REFERENCE TO RELATED APPLICATIONS

This application claims the benefit of U.S. Provisional Application No. 61/952,497, filed Mar. 13, 2014, the disclosure of which is incorporated by reference.

TECHNICAL FIELD

The presently disclosed technology generally relates to an apparatus for transporting vehicles, and more particularly to an apparatus for transporting all-terrain vehicles.

BACKGROUND

All-terrain vehicles, or ATVs, are a popular recreation vehicle. These vehicles provide an effective form of travel over adverse terrain that is impassable to many larger vehicles such as pickup trucks and SUVs. ATVs, however, are not practical to drive long distances to a preferred riding trail. This issue results in owners and operators transporting ATVs to the area of intended use by utilizing a pickup truck, or a trailer towed by a pickup or SUV.

In many places it is not uncommon to see ATVs loaded into or onto the bed of a pickup or being towed behind pickup or SUV on a trailer. Occasionally, and dangerously, some people choose to tow an ATV on a trailer behind a camp trailer. This dual trailer setup can be unpredictable and dangerous when driven in non-ideal conditions. Further, the use of a separate ATV trailer can add significant cost to an already expensive hobby.

When an ATV is loaded into the bed of a pickup, a single ATV occupies the entirety of the pickup bed. This configuration often prevents the use of the trailer hitch located beneath the bed as the tailgate has to be left down. Another current method is to have a raised flat bed that allows two ATVs to sit side by side, overhanging the sides of the pickup causing potential hazards when passing objects or other vehicles. The side by side configuration makes the whole vehicle dangerously top heavy.

SUMMARY

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

Disclosed is a device for transporting up to two ATVs, such as in the in the bed of a pickup truck, in a fixed storage rack, or in a storage facility or on the floor. The installation on a truck will be described, with the understanding that the ATV carrier could be mounted in other place. The disclosed device utilizes two ATV holders, each having two ends and each able to hold an ATV. The ATV holders are oriented so that both ATVs are held in line with the truck bed, for example the front end of the first ATV faces the front end of the second ATV.

The first ATV holder is mounted, on a first end, to a base, and the base is mounted to the bed of the pickup truck. The ATV holder is mounted so that it can rotate from a first or loading position, where the first ATV holder is in a generally horizontal orientation for loading or unloading, to a second position where the first ATV holder is in a mostly vertical position for transport. In the first position, the first ATV holder extends toward the tailgate of the pickup truck. The mounting position of the first ATV holder must be far enough from the cab of the pickup that an ATV tipped on the front or rear end will not contact the cab.

The second end of the first ATV holder is attached to the first end of the second ATV holder. The second ATV holder is attached by a hinge, or other rotatable connection, so that the second ATV holder can rotate from a first position where the second ATV holder function as both a ramp for loading the first ATV holder as well as an ATV holder, to a second, nearly vertical position. When the first ATV holder is moved to the second position, the second ATV holder will rotate to a mostly vertical position to facilitate transport of an attached ATV. When the ATV carrier is in the transport position, the two ATV holders form and "A" frame, or pyramid type, shape. The second end of the second ATV holder also incorporates landing wheels on the second end. During the transition from the first position to the second position the landing wheels allow the second ATV holder to roll across a ground track or pavement until the second ATV holder reaches an incline of about 1:1 where it will ascend to the truck bed level and from there continue on the landing wheels to the position where it is secured in the second position.

The base is preferably rectangular and is extendable from a shortened configuration where the tailgate can be raised during transport, but during loading and unloading a part of the base is extended over the tailgate in order to prevent weight being transferred to the tailgate from the ATVs and the device. Other mechanisms, such as installing a support beneath the first ATV holder to support the ATV holder near the end of the bed, but before the tailgate, are also acceptable for preventing weight distribution onto the tailgate. To further improve the transition between the first position and the second position, the base is equipped with a roller on the end that extends over the tailgate. This allows the second ATV holder to roll over the end of the base during the transition.

Each ATV holder is designed to hold a single ATV. While some changes in length and width are possible, it is preferable to keep the dimensions as small as possible. For instance, the combined length of the ATV holders should be sufficient to hold each ATV without the ATVs making contact while still allowing a user to secure the ATVs to the holder. Additionally each ATV holder can have a variety of configurations, with a preferred design being two separate tracks, one set for each side of ATV wheels, with a space between the tracks to reduce weight and aerodynamic drag. This configuration can utilize one or more cross members in order to provide an attachment point for the jack mechanism and to improve strength properties of the device.

Once the ATVs are secure, the ATV holder can be transitioned from the first position into the second position, A frame shape, for transport. Due to the heavy weight of the ATVs and the ATV transport device, it is advantageous to have a lift mechanism to aid in lifting the device into the transport position as well as lowering the device into the load or unload position. Preferably this mechanism is a scissor jack capable of extending to push the device into the second position, or retract to pull the device into the first position. Other alternatives are possible, such as a bottle jack are also useable. Further, the jack mechanism can be hand powered or electrically powered using the pickup or SUV as a power source. In the electrically powered versions, it is also possible to utilize other jack mechanisms such as hydraulic or pneumatic jack or piston systems to raise and lower the device.

Structures for securing the ATVs on the racks are also present, and can be straps, chains, pins, locking brackets, or other structures.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE EXEMPLARY EMBODIMENTS

Figure 1:
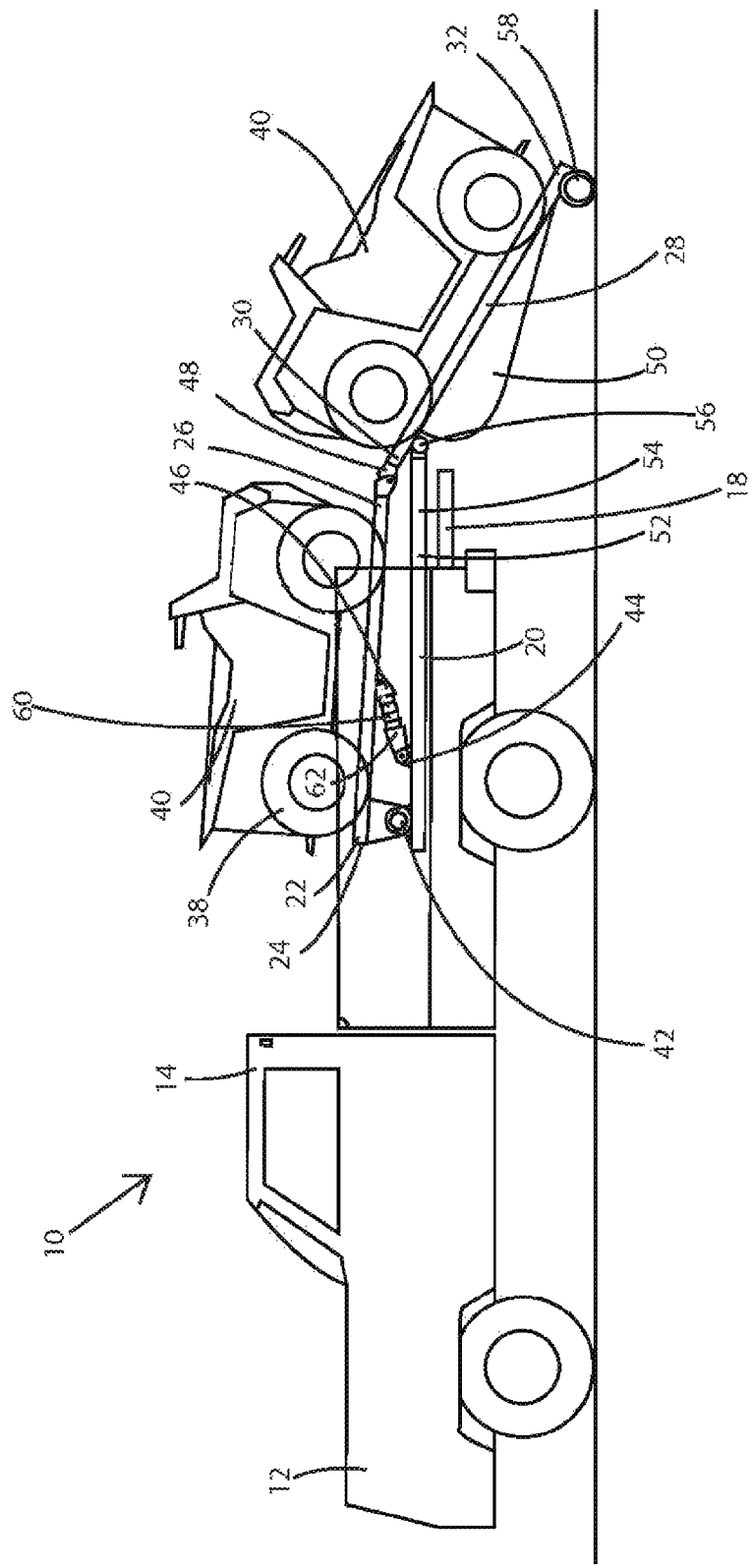
FIG. 1 is a side view of the ATV transport device, in the loading and unloading position.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Shown in the FIGS. 1-7 are some preferred embodiments of the claimed technology. Shown in FIG. 1 is the ATV transport device 10, mounted in a pickup truck 12, the truck having a cab 14, a bed 16, and a tailgate 18. The device base pad 20 is shown mounted to the truck bed 16. The base pad can be a steel plate or a steel beam, angle iron, pipe, or combination thereof, which is bolted to the truck bed 16. Attached to the base pad 20 is a first ATV rack 22, which has a first end 24, and a second end 26. The ATV racks can be a flat sheet of metal, but a preferred version uses a left wheel track 34 and a right wheel track 36, which can be generally u shaped with sidewalls which guide the wheels 38 of the ATVs 40. The wheel tracks would typically be, wide enough for the particular ATV it is made for, with sidewalls several inches tall.

Figure 2:
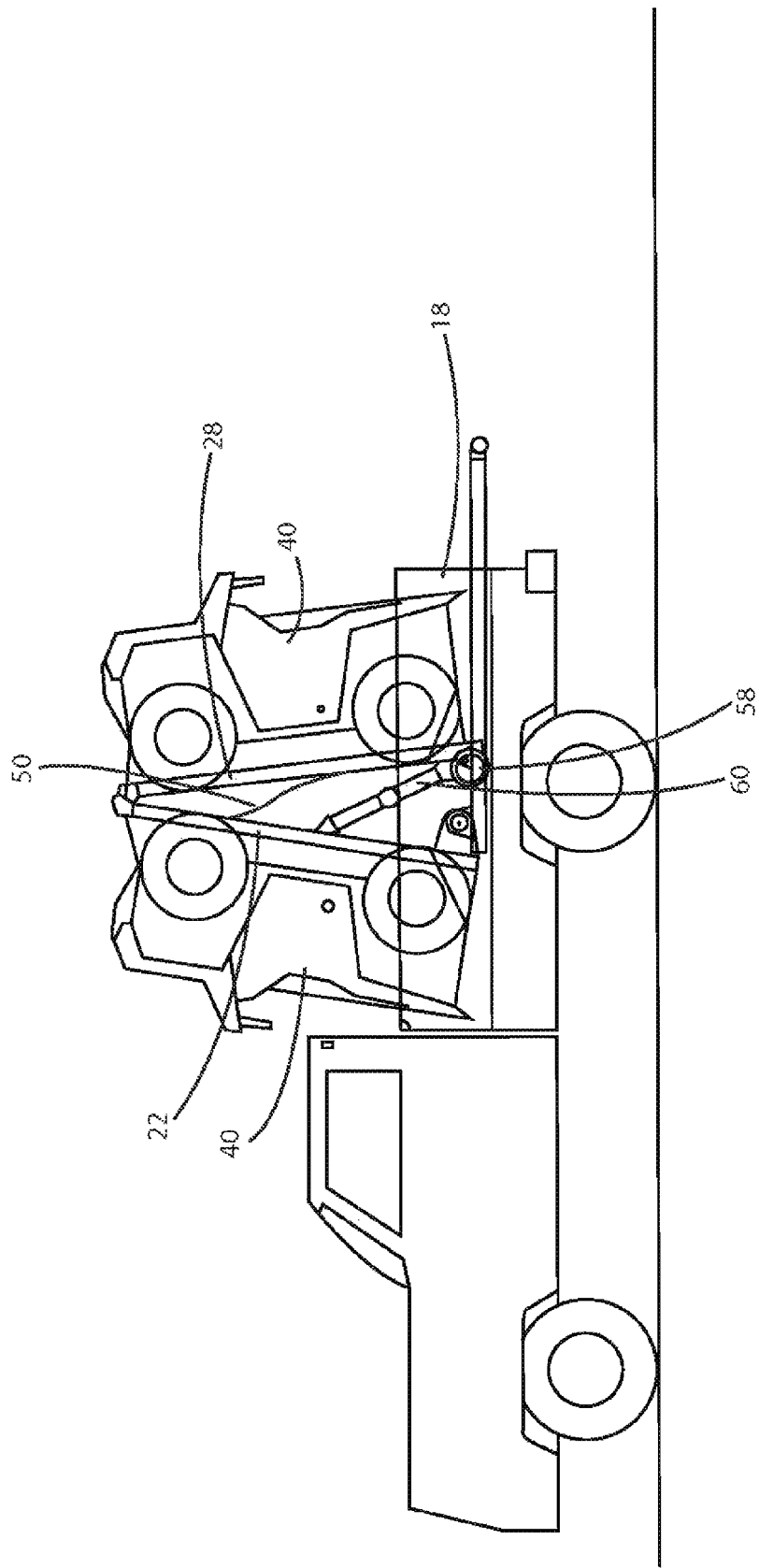
FIG. 2 is a side view of the ATV transport device, in the transport position.

The first ATV rack 22 is attached to the base pad 20 at a first pivot point 42, and can move between a generally horizontal loading position shown in FIG. 1 to a generally vertical position for transport shown in FIG. 2. Attached to the second end 26 of the first ATV rack 22 is the first end 30 of the second ATV rack 28, which is attached by at least one hinge 48. If the ATV racks are flat sheets, a multiple or a single long hinge may be used. If left and right wheel tracks are used, a hinge 48 would join the left and right wheel tracks of the first and second ATV racks.

Shown in FIG. 1 is a guide rib 50 on the underside of the second ATV rack 28. The guide rib 50 is a curved plate of steel with the edge formed by a round piece of metal, such as a pipe. The guide rib 50 extends down from the middle of the second ATV rack 28.

Attached to the base pad 20 is an extension track 52, which at the second end 54 has an attached guide roller 56. The guide roller 56 may be several inches in diameter, and extends beyond the end of the tailgate 18 when it is laid horizontal. The extension track 52 is made of steel and can be in one piece or two, and has left and right tracks for landing wheels 58 attached to the second end 32 of the second ATV rack 28. The landing wheels 58 are separated by a divider which can be several inches tall. The landing wheels 58 can be approximately 4 to 10" in diameter, as an example, and may be solid rubber or plastic.

Attached to the base pad is a jack 60, which can be hydraulic, or an electrically powered scissor jack or others types of jacks known in the art. The first end 62 of the jack 60 is attached to the base pad at a second pivot point 44, and at the second end to the first ATV rack at a third pivot point 46, such as to a cross piece of steel. In the case of a hydraulic jack, when the jack 60 pushes out the piston, the jack lifts the second end 26 of the first ATV rack 22 into a generally vertical position. Since the second ATV rack 28 is hinged to the second end 26 of the first ATV rack 22, the first end 30 of the second ATV rack 28 is also lifted into a semi vertical position.

FIG. 2 shows the ATV transport device 10 with the ATV racks 22 and 28 in a generally vertical transport position, in which the truck tailgate 18 may be closed. As the ATVs are lowered from the position shown in FIG. 2 into the position shown in FIG. 1, the tailgate 18 is first laid horizontal, and the extension track 52 is extended to a point that the guide roller 56 extends beyond the end of the tailgate 18. There are bolts and removable bumpers locking the ATV racks in place, which are removed, and the jack 60 then pulls the first ATV rack 22 toward a horizontal position. As the ATV racks 22 and 28 lower, the landing wheels 58 move down the extension track 52, and the guide rib 50 of the second ATV rack 28 engages the guide roller 56 at the end of the extension track 52. The guide rib 50 continues to move over the guide roller 56, pushing the ATV rack 28 out until the landing wheels 58 touch the ground. At that point, and ATVs 40 can be unlocked from the ATV racks 22 and 28, and unloaded to the ground.

Figure 3:
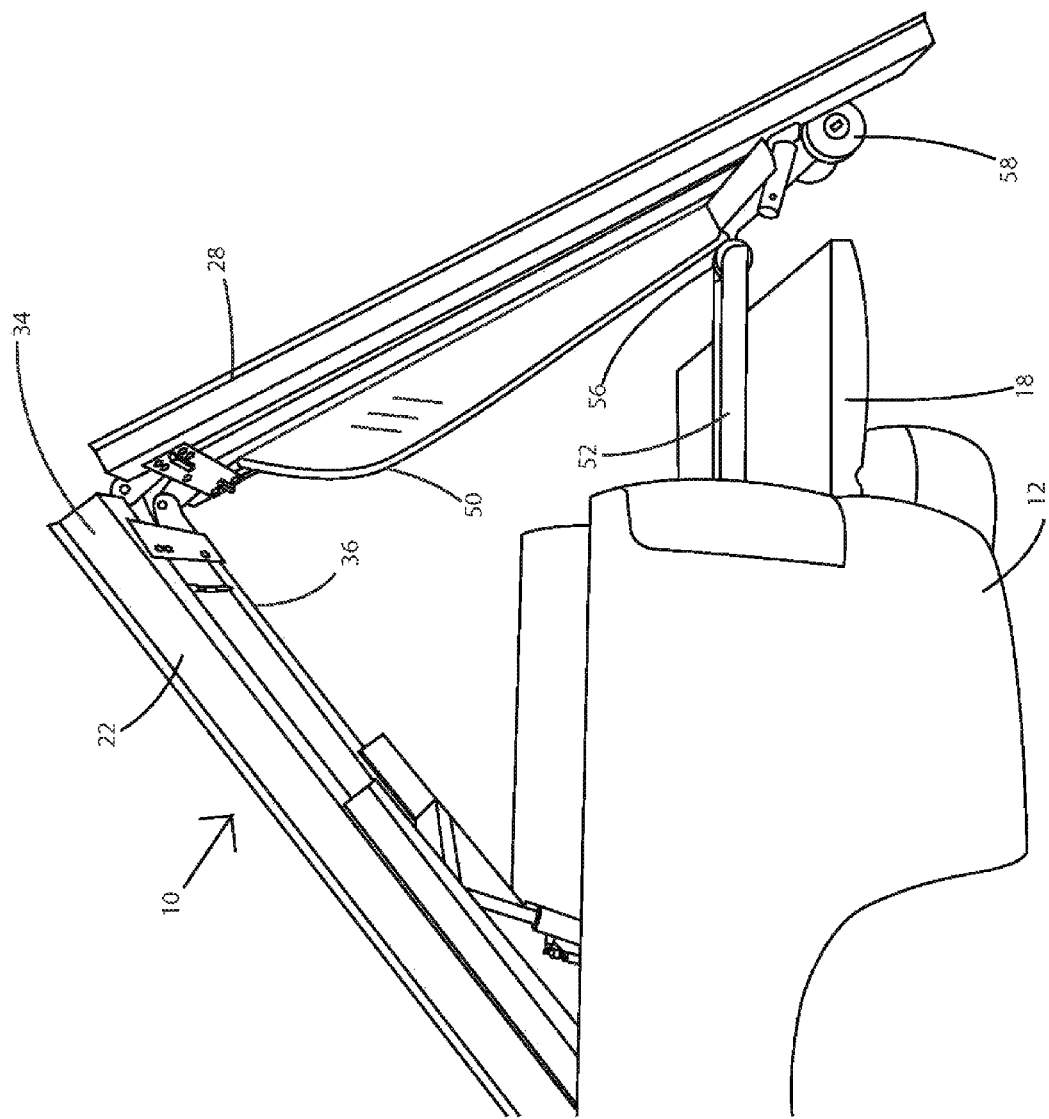
FIG. 3 is a side perspective view of the ATV transport device, showing the unit partially deployed.

FIG. 3 shows a side view of the disclosed ATV transport device, with the ATV racks in a partially deployed position. The guide rib 50 is shown attached to the underside of the second ATV rack 28, and engaged with the guide roller 56. As the ATV racks continue to be lowered, the guide rib 50 would roll over the guide roller 56, pushing the ATV rack 28 out until the landing wheels 58 contacted the ground.

Figure 4:
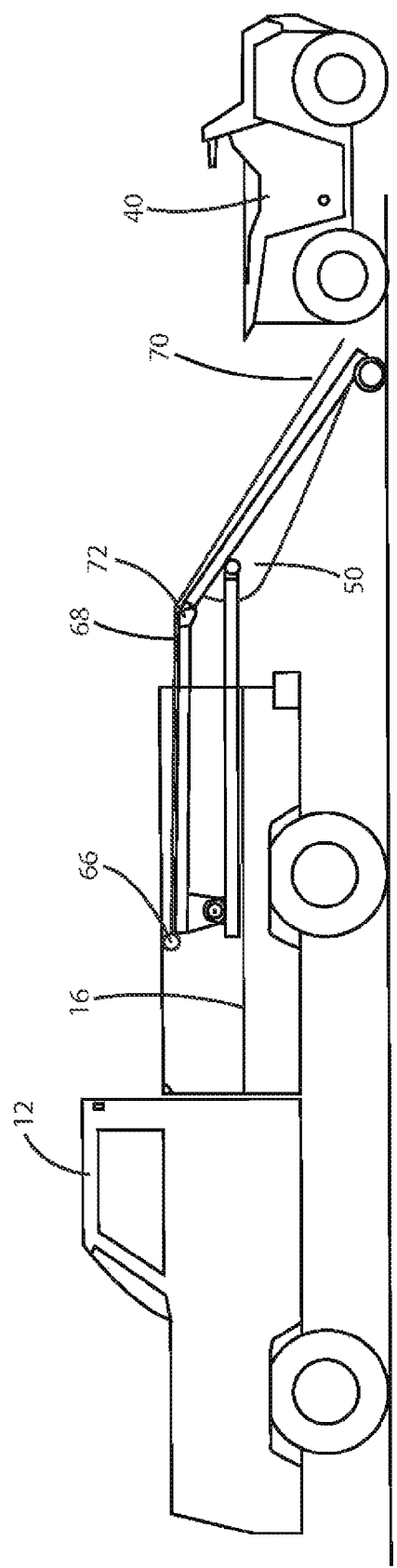
FIG. 4 is a side view of the ATV transport device, showing the loading or unloading of an ATV.

FIG. 4 shows the device loading or unloading an ATV from or to the ground. Loading and unloading is facilitated by the use of a towing winch 66, which can be electrically powered. The towing winch 66 has an extendable cable 68 and a cable end 70, which is attachable to an ATV 40. The cable 68 passes over a routing pulley 72 to guide the cable 68 as it passes over the ATV racks. When unloading, the rear ATV is unlocked, and lowered to the ground by the towing winch 66. The front ATV is then unlocked and lowered to the ground by the towing winch. The reverse steps are taken to load the ATVs onto the ATV transport device. After loading they are locked in place by multiple ATV securing straps, and the ATV racks are secured in position by position bolts.

Figure 5:
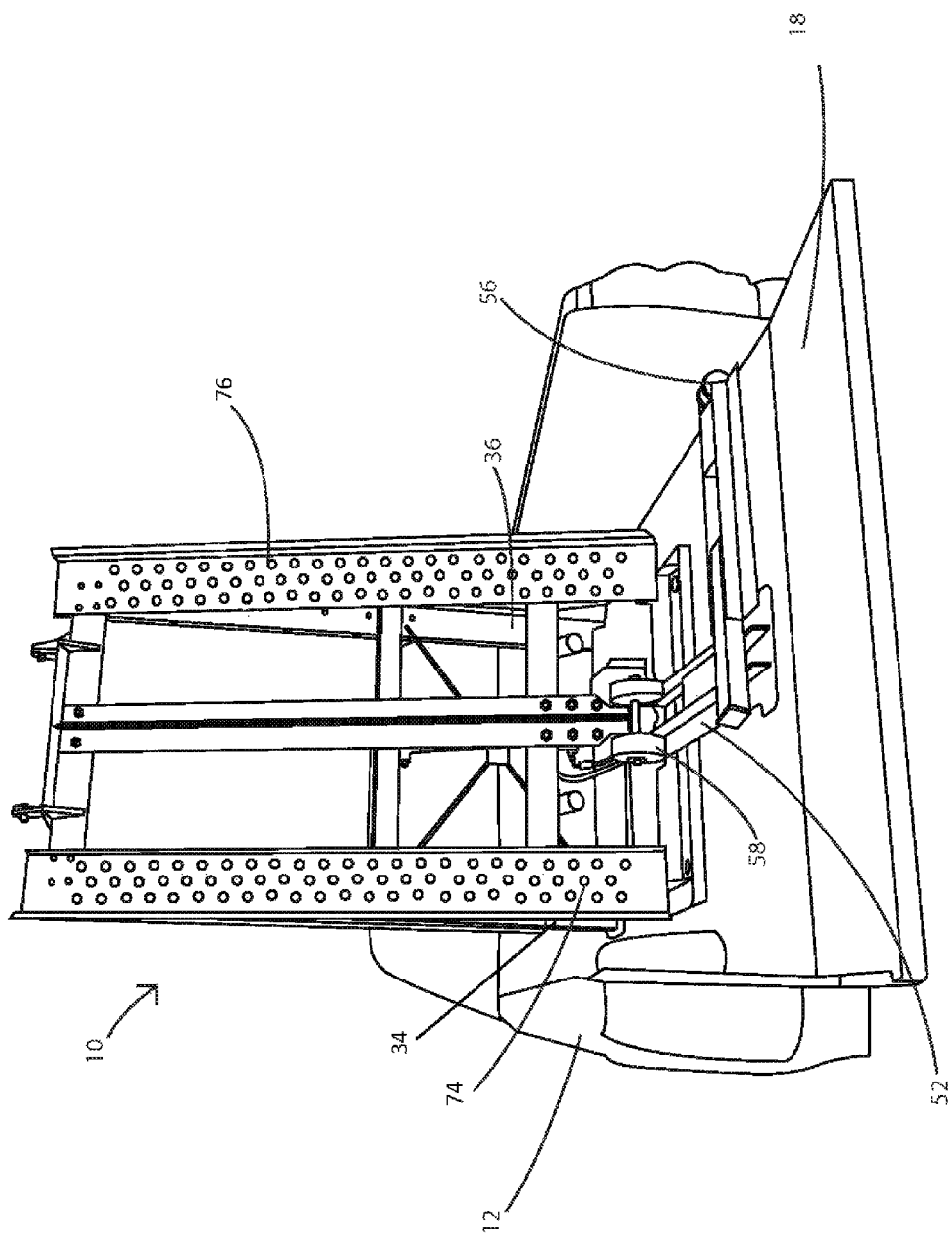
FIG. 5 is a perspective view of the ATV transport device and the truck from the rear of the truck.

FIG. 5 shows a few of the rear of a truck 12, with the ATV transport device 10 in the rear of the truck. Shown are the first and second ATV racks, which are in the form of individual left wheel tracks 34 and 74 and right wheel tracks 36 and 76.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. An ATV transport device for use with a pickup truck with a cab, a bed and a tailgate, comprising:
    a base pad attached to said bed of said pickup truck;
    a first ATV rack attached to said base pad, said first ATV rack with a first end closest to said truck cab, and a second end furthest away from said truck cab, with said first end of said first ATV rack rotatingly attached to said base pad at a pivot point;
    a second ATV rack with a first end attached by at least one hinge to said second end of said first ATV rack, with said second ATV rack second end supported by at least one landing wheel, with said second ATV rack having a guide rib on an underside of said second ATV rack, with said first and second ATV rack configured for attachment of a first and second ATV to said racks;
    at least one jack, said jack having a first end attached to said base pad at a second pivot point, and a second end attached to said first ATV rack at a third pivot point, with said jack configured to push against said first ATV rack when said first ATV rack is in a generally horizontal position in order to lift said second end of said first ATV rack away from said truck bed and into a generally vertical position, with said lifting of said first ATV rack second end causing simultaneous lifting of said first end of said second ATV rack into a generally vertical position;
    an extension track attached to said base pad, with a first end attached to said base pad, and with a second end having a guide roller, with said extension track second end configured to extend beyond said tailgate of said pickup;
    with said at least one landing wheel on said second end of said second ATV rack configured to roll on said extension track from a vertical transport position into an extended loading unloading position, with said second ATV track guide rib configured to roll over said guide roller of said extension track until said at least one landing wheel touches the ground behind said truck;
    at least one ATV securing lock on each of said ATV racks, for securing one ATV to said first ATV rack, and one ATV to said second ATV rack; and
    a towing winch attached to said base pad, said towing winch having an extendable cable and a cable end, for attaching said cable and cable end to said ATVs one at a time, for pulling said ATVs from said ground onto said first and second ATV racks when said racks are in a loading position, and for lowering said ATVs from said ATV transport device to said ground over said first and second ATV racks.

2. The ATV transport device of claim 1 in which said at least one ATV securing locks are comprised of nylon straps with a lockable ratcheting strap winder.

3. The ATV transport device of claim 1 which further comprises a routing pulley attached to said first ATV rack for guiding said cable from said towing winch to said ATVs.

4. The ATV transport device of claim 1 wherein said at least one jack is a hydraulic jack.

5. The ATV transport device of claim 1 in which said first and second ATV racks are each comprised of a left and right wheel track, with said at least one hinge connecting said first ATV rack to said second ATV rack comprises a left and right hinge, connecting said left and right wheel track of said first and second ATV racks.

6. The ATV transport device of claim 1 in which said at least one landing wheel is comprised of two landing wheels which are configured to roll in said extension track with a dividing wall on said extension track between said landing wheels.

7. The ATV transport device of claim 1 which further comprises a first and a second removable ATV bumpers, with said ATV bumper boltable in place for transport of ATVs, and removable for loading and unloading of ATVs.

8. The ATV transport device of claim 1 in which said guide rib is generally bow shaped, with a front portion even with said second ATV rack first end, a thicker mid portion extending away from said second ATV rack underside, and a receding portion sloping to join said second ATV rack second end.

9. An ATV transport device for use with a pickup truck with a cab, a bed and a tailgate, comprising:
    a base pad attached to said bed of said pickup truck;
    a first ATV rack comprised of a left and right wheel track, said first ATV rack attached to said base pad, said first ATV rack with a first end closest to said truck cab, and a second end furthest away from said truck cab, with said first end of said first ATV rack rotatingly attached to said base pad;
    a second ATV rack comprised of a left and right wheel track, said first ATV rack with a first end attached by at least one hinge to said second end of said first ATV rack, with said second ATV rack second end supported by at least one landing wheel, with said second ATV rack having a guide rib on an underside of said second ATV rack, with said first and second ATV rack configured for attachment of a first and second ATV to said racks;
    at least one jack, said jack having a first end attached to said base pad at a pivot point, and a second end attached to said first ATV rack at a second pivot point, with said jack configured to push against said first ATV rack when said first ATV rack is in a generally horizontal position in order to lift said second end of said first ATV rack away from said truck bed and into a generally vertical position, with said lifting of said first ATV rack second end causing simultaneous lifting of said first end of said second ATV rack into a generally vertical position;
    an extension track attached to said base pad, with a first end attached to said base pad, and with a second end having a guide roller, with said extension track second end configured to extend beyond said tailgate of said pickup;
    with said at least one landing wheel on said second end of said second ATV rack configured to roll on said extension track from a vertical transport position into an extended loading unloading position, with said second ATV track guide rib configured to roll over said guide roller of said extension track until said at least one landing wheel touches the ground under said truck;

at least one ATV securing lock on each of said ATV racks, for securing one ATV to said first ATV rack, and one ATV to said second ATV rack; and a towing winch attached to said base pad, and a routing pulley attached to said second ATV rack for guiding said cable from said towing winch to said ATVs, said towing winch having an extendable cable and a cable end, for extending over said routing pulley and attaching said cable and cable end to said ATVs one at a time, for pulling said ATVs from said ground onto said first and second ATV racks when said racks are in a loading position, and for lowering said ATVs from said ATV transport device to said ground over said first and second ATV racks.

10. The ATV transport device of claim 9 in which said at least one ATV securing locks are comprised of nylon straps with a lockable ratcheting strap winder.

11. The ATV transport device of claim 9 wherein said at least one jack is a hydraulic jack.

12. The ATV transport device of claim 9 in which said first and second ATV racks are each comprised of a left and right wheel track, with said at least one hinge connecting said first ATV rack to said second ATV rack comprises a left and right hinge, connecting said left and right wheel track of said first and second ATV racks.

* * * * *